United States Patent [19]

Grant

[11] 4,239,327
[45] Dec. 16, 1980

[54] OPAQUE PERFORATED FILTER

[76] Inventor: Roy W. Grant, 529 Wilshire La., Santa Maria, Calif. 93454

[21] Appl. No.: 883,884

[22] Filed: Mar. 6, 1978

[51] Int. Cl.³ .............................................. G02B 7/04
[52] U.S. Cl. ........................................ 350/17; 350/46; 350/63; 350/205; 350/206; 351/46
[58] Field of Search ................... 350/205, 63, 46, 269, 350/17, 206; 351/46

[56] References Cited

U.S. PATENT DOCUMENTS

| | | | |
|---|---|---|---|
| 593,993 | 11/1897 | Elwood | 350/205 |
| 1,085,048 | 1/1914 | Hirkill | 350/206 X |
| 1,368,608 | 2/1921 | Curran | 350/205 X |
| 1,589,475 | 6/1926 | Lowther | 296/97 L |
| 1,959,915 | 5/1934 | Guthrie | 351/46 |
| 2,012,620 | 8/1935 | Bean et al. | 351/46 |
| 2,036,447 | 4/1936 | Tuttle et al. | 350/269 |
| 2,488,188 | 11/1949 | Halvorson | 350/65 |
| 3,398,023 | 8/1968 | Jacobsen et al. | 350/63 X |
| 3,926,500 | 12/1975 | Frosch et al. | 350/17 |

FOREIGN PATENT DOCUMENTS

| | | | |
|---|---|---|---|
| 346421 | 2/1937 | Italy | 350/205 |
| 475134 | 11/1936 | United Kingdom | 350/205 |

*Primary Examiner*—Paul A. Sacher
*Attorney, Agent, or Firm*—Harry W. Brelsford

[57] ABSTRACT

A light intensity filter for a telescope or other optical instrument viewed by the human eye is formed of an opaque material having a plurality of holes or windows. These windows transmit a reduced amount of light to the image-forming optical component. The area of the windows relative to the area of the optical component is selected to the light intensity being imaged. The filter is especially useful for telescopes and the like, wherein the image is viewed by a human observer and the light source is momentarily of great intensity. Under these conditions the filter prevents temporary blindness of the observer due to excessive illumination, for example, tracking a moving object across the sun.

4 Claims, 5 Drawing Figures

OPAQUE PERFORATED FILTER

This invention relates to filters for optical instruments and has particular applicability to optical instruments that form images of objects having great variations in illumination over short periods of time and wherein a human observes the image. For example, using the invention at night the flame of a rocket may be viewed without visual distress and during the day objects passing in front of the sun may be viewed without momentary blindness.

BACKGROUND OF THE INVENTION

Many optical instruments are provided with automatic apertures or diaphragms that respond to a light sensor. The automatic diaphragms open up in dim light and close down in very bright light. For example, cameras with f1.2 lenses may close down to f16 in the presence of very bright light and under lesser light open up to various intermediate stops, depending upon the available light, and will be wide open at f1.2 in the dimmest light. Many times, however, the difference in illumination is so great that the automatic aperture cannot respond sufficiently and the camera must then be adjusted, automatically or manually, to a shutter speed that will accommodate the excessively bright scene or the excessively dim scene.

In optical instruments having images viewed by humans, there is no possibility of changing the shutter speed to accommodate the range of illumination that exceeds the diaphragm openings of the lens. If a human is observing an image in dim light, the iris of each eye is at maximum opening. If now the image is suddenly brightly illuminated, each iris will try to reduce its opening, but with a definite time lag on the order of many seconds. The inability of the iris to close rapidly overloads the retina of the eye, causing a blanking out of all images. This momentary blindness is commonly encountered also when a person inadvertently looks at the sun. The combination of slow iris accommodation and momentary blindness in the presence of momentarily bright images incapacitates the human observer, and he is unable to see the scene or follow any action for many seconds.

The inability of a human observer to view a scene that momentarily becomes intensely bright is aggravated when a momentarily bright scene quickly becomes relatively dark again. The iris of each eye previously attempting to close down must now try to open up the aperture to admit more light. Again, there is a time lag. This well known theater effect may take up to two minutes for the eye to accommodate to the darkness. Again, there is a loss of acuity because of the dim image on the retina. What little image is transmitted by the retina is overwhelmed by the continuing bright spot blindness from the preceding bright light.

Neutral density filters have been tried to control this inability of human observers to view momentarily bright scenes, but have not proved to be a good solution, and the images are blurred and indistinct under these conditions.

SUMMARY OF THE INVENTION

I have discovered a mechanical type of filter that satisfactorily solves this problem. A removable plate having multiple apertures is placed in the line of sight of the telescope or other viewing instrument. The viewer does not see the apertures as such, but views the entire image reduced in intensity by the area of the apertures relative to the effective area of the objective lens or reflector. For refractive optics, the apertured plate may be placed in front of or behind the objective lens, and for reflective optics, the apertured plates must be placed in front of the objective optical member. The distance in front of the objective is not critical, but with small f openings that approach in size the apertures in the plate part of the scene is blocked out. The distance in back of a refractive optical component is governed by the cone of convergence of the rays.

The filter plate may be manually moved into or out of the line of sight or a power drive may be used under manual control, or a completely automatic system may be used actuated by the amount of illumination of the subject being viewed. A stream of air under pressure may be introduced between the objective lens and my filter to exclude rain and fog and to keep optically open the filter windows or holes.

DETAILED DESCRIPTION

Various objects, advantages, and features of the invention will be apparent in the following description and claims, considered together with the accompanying drawings forming an integral part of this specification and in which:

Figure 1:
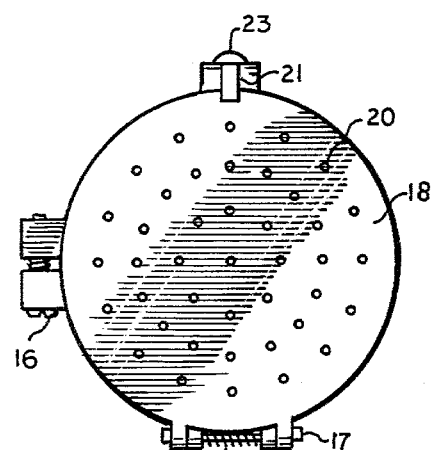
FIG. 1 is a front elevation view of a telescope upon which is mounted a presently preferred embodiment of my filter.
Figure 2:
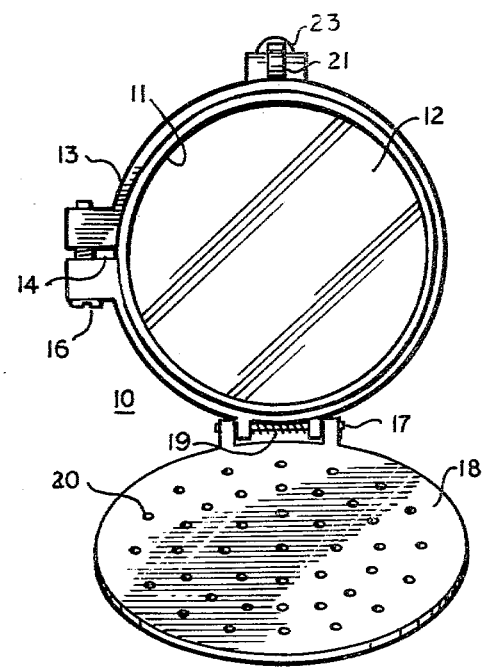
FIG. 2 is a front elevation view of the telescope of FIG. 1 with my filter hinged to a position out of the path of the light rays entering the objective lens of the telescope.
Figure 3:
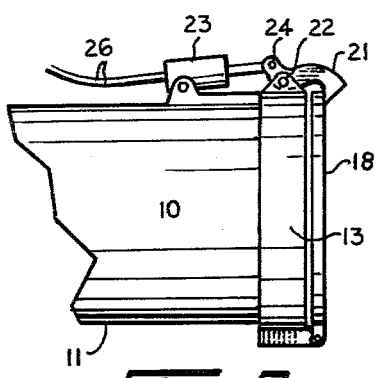
FIG. 3 is a fragmentary elevation view on a reduced scale of the latching mechanism for my filter, which appears at the top part of FIGS. 1 and 2.

Referring to FIGS. 1, 2, and 3, a telescope 10 has a barrel 11 in which is mounted an objective lens 12. Clamped about the exterior of the telescope barrel 11 is a circular collar 13 which is split at 14 and a suitable bolt or other fastener 16 tightens the collar 13 about the barrel 11 to hold it in place. Hinged to the bottom part of the clamp ring 13 is a hinge pin 17 hingeing a filter plate 18 to the clamp ring 13, and a torsion spring 19 normally holds the plate 18 in the open position of FIG. 2. This filter plate 18 is provided especially in accordance with the invention.

Referring now to the upper parts of FIGS. 1, 2, and 3, pinned for pivoting to the clamp collar 13 is a latch 21 rotating about a pin 22, and this latch 21 is rotatable counterclockwise as viewed in FIG. 3 by means of a solenoid 23 having a pin 24 connecting its plunger to the latch 21. A pair of wires 26 leads to a manual switch under the control of the observer viewing the images created by the telescopic lens 12.

In use the filter plate 18 is latched to its closed position shown in FIGS. 1 and 3, and when the solenoid 23 is energized the latch 21 rotates counterclockwise in FIG. 3 to release the filter plate 18 and the torsion spring 19 of FIG. 2 then rotates the filter plate 18 to the position illustrated in FIG. 2.

Figure 4:
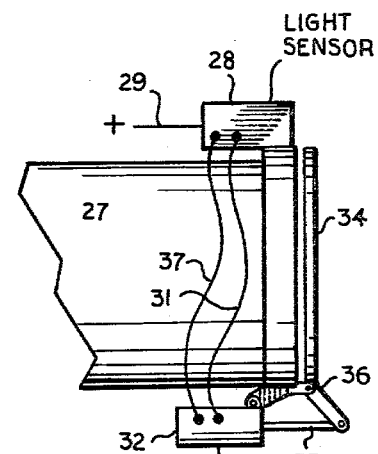
FIG. 4 is a schematic diagram of a telescope fitted with a light sensor for automatically moving my filter into or out of the path of the light rays entering the telescope.

Referring now to FIG. 4, there is illustrated a modification of the invention wherein a double-acting solenoid will automatically place the filter over the telescope when it is needed and will automatically remove it from the light rays to the telescope when it is not needed. A telescope 27 has mounted thereon a light sensor 28 having the same field of view as the telescope 27. When excessive light reaches the light sensor 28, it passes current from a single conductor 29 to a conductor 31, which energizes a solenoid 32 to cause its plunger 33 to erect a filter 34 hinged at 36 to reduce the amount of light reaching the objective lens of the telescope 27. If now the light sensed by sensor 28 falls below a predetermined level, the sensor 28 then passes current to a conductor 37, which energizes the solenoid 32 in the reverse direction to cause the plunger 33 to move inwardly, thereupon causing rotation of the filter 34 clockwise to a position out of the path of the light rays reaching the telescope.

Figure 5:
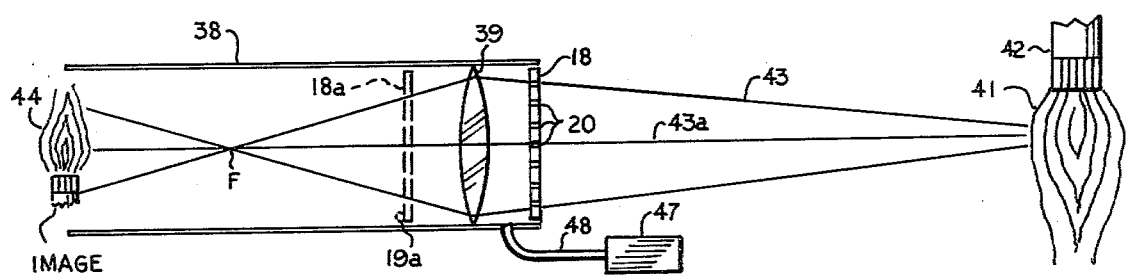
FIG. 5 is a schematic diagram of the light rays passing through a filter embodying my invention and into an image-producing optical instrument.

Referring now to FIG. 5, a telescope 38 has an objective lens 39, which receives light from a flame 41 of a rocket 42. These light rays 43 travel through the various holes 20 of filter 18, pass through the lens 39, and form an image 44, which is viewed by a human operator either directly on ground glass or through an erecting eyepiece. The light rays 43 passing through the lens 39 converge at a point F and thereafter diverge to form the image 44. Illustrated in broken outline is an alternative position 18a of a filter hinged at 19a and this filter will function in the same way as the filters forwardly of the lens 39 as long as they stay appreciably away from the focus of the light rays at F. A hose 48 directs air from source 47.

I presently prefer to make my filters out of sheetmetal or rigid sheet plastic apertured with the desired number of holes 20. The pattern of the holes is immaterial. They may be random or geometrically spaced, but if the quality of the lens is poor then the spacing should be geometrically equidistant for the best quality image. The filter could, of course, be made out of any transparent material which has an opaque mask of one type or another through which there are many holes. Accordingly, in such a type of filter, the transparent portions would be referred to as windows and I use this terminology of "windows" to refer both to glass or other material material that is transparent as well as to airspace holes through opaque material. Thus, semitransparent materials could be used also, for example, on a glass having a semisilvered surface with clear windows.

Many cameras and some telescopes have variable apertures, and at the smallest opening these appear like one of my filters with a hole on the optical axis. Referring to the light rays of FIG. 5, the optical axis would be the central ray 43a. Variable apertures are generally placed behind the lens to preclude the possibility of picking up dirt and lint while stationary stops are placed either in front of or behind the lens. I prefer at present to have one or more holes disposed off the optical axis.

Referring now to the amount of area represented by the windows or holes in may filter compared to the effective area of the objective lens of the optical instrument in which it is used, this area will vary according to the application. I find that for viewing rockets at nighttime the holes 20 may have an area of about one percent of that of the effective area of the objective lens. This same relationship is generally true for daytime viewing where the telescope inadvertently views the sun. For subjects having less intense illumination, generally a larger portion of the filter area may be represented by windows or holes. As mentioned previously, this invention is applicable also to reflector types of image-forming optical components such as the reflectors commonly encountered in astronomical telescopes and in the camera lenses of the type generally referred to as catadioptric.

Concerning now the number of holes in the filter, a single hole will give a very narrow field of view to the lens whereas two holes, especially widely spaced so that they are near the perimeter of the objective optic whether refractor or reflector will give nearly the full field of view. The geometric pattern illustrated in FIG. 1 will, of course, give a full field of view inasmuch as the outer holes are very close to the perimeter of the lens 12. The greater the number of holes toward the perimeter and the greater the general spacing of such holes, the more nearly the full field of view of the lens is utilized.

As mentioned previously, a filter constructed in accordance with the invention does not interfere with the image being created. It merely makes the image dimmer. If, however, the f opening of the lens is reduced to a very small amount and the filter placed at a great distance from the lens, then there may be an image formed of the filter itself and the subject matter will be viewed through the holes of the filter. This would occur, for example, if the filter were placed five feet away from the normal lens of a 35 mm camera, and the f opening closed down to a very small amount, for example, f22. The same lens, however, opened up to f3.5 will give the whole image, and the holes will not be visible, and the entire subject matter will be imaged on the picture plane of the camera. Such a combination of small f opening and a filter a great distance from the lens will therefore reduce the quality of the image, but not necessarily the usefulness of the filter. The size of the holes in the opaque material does not appear to be critical, but it is suspected that if the holes approach pinhole in size that the defraction effects will degrade the image. When the total area of all the holes in the filter approaches fifty percent of the cross sectional area of the light being received by the image-forming optical component of the instrument, then the utility of the filter falls off, inasmuch as automatic diaphragms are useful in this range.

The invention has been described with respect to presently preferred embodiments thereof as required by the Statutes. Various modifications, improvements, and variations will be apparent to those skilled in the art. All such modifications, variations, and improvements that fall within the true spirit and scope of the invention are encompassed within the terms of the following claims.

I claim:

1. The combination for viewing by the human eye a brightly lighted object, comprising:
   a. a telescope having an objective lens and an eyepiece lens, said eyepiece being of the type for viewing by a human eye;
   b. and an opaque filter disposed at the objective lens having a plurality of windows of approximately equal size and approximately uniform distribution; said combination further characterized in that the viewed image is of reduced intensity, but is otherwise unaffected.

2. The combination of claim 1 wherein the number of windows is from a plurality to the order of forty.

3. The combination of claim 1 wherein the areas of the windows are in the range of about one percent up to approximately fifty percent of the objective lens area.

4. The combination of claim 1 wherein the windows in the filter are apertures, the filter is disposed at the outer surface of the objective lens, but spaced therefrom, and there is added means for flowing a gas into the space between the objective lens and the filter whereby the gas flow protects the lens surface from fog, rain, and dew, and the gas exiting through the filter apertures keeps the apertures clear.

* * * * *